Oct. 21, 1952 C. G. JOHNSON 2,614,847
AUTOMATIC PHONOGRAPH
Filed Feb. 9, 1945 8 Sheets-Sheet 1

Inventor:
Carl G. Johnson,
By John F. Eakins.
Attorney

Oct. 21, 1952   C. G. JOHNSON   2,614,847
AUTOMATIC PHONOGRAPH
Filed Feb. 9, 1945   8 Sheets-Sheet 2

Inventor:
Carl G. Johnson,
By John F. Eakins
Attorney

Oct. 21, 1952 — C. G. JOHNSON — 2,614,847
AUTOMATIC PHONOGRAPH
Filed Feb. 9, 1945 — 8 Sheets-Sheet 3
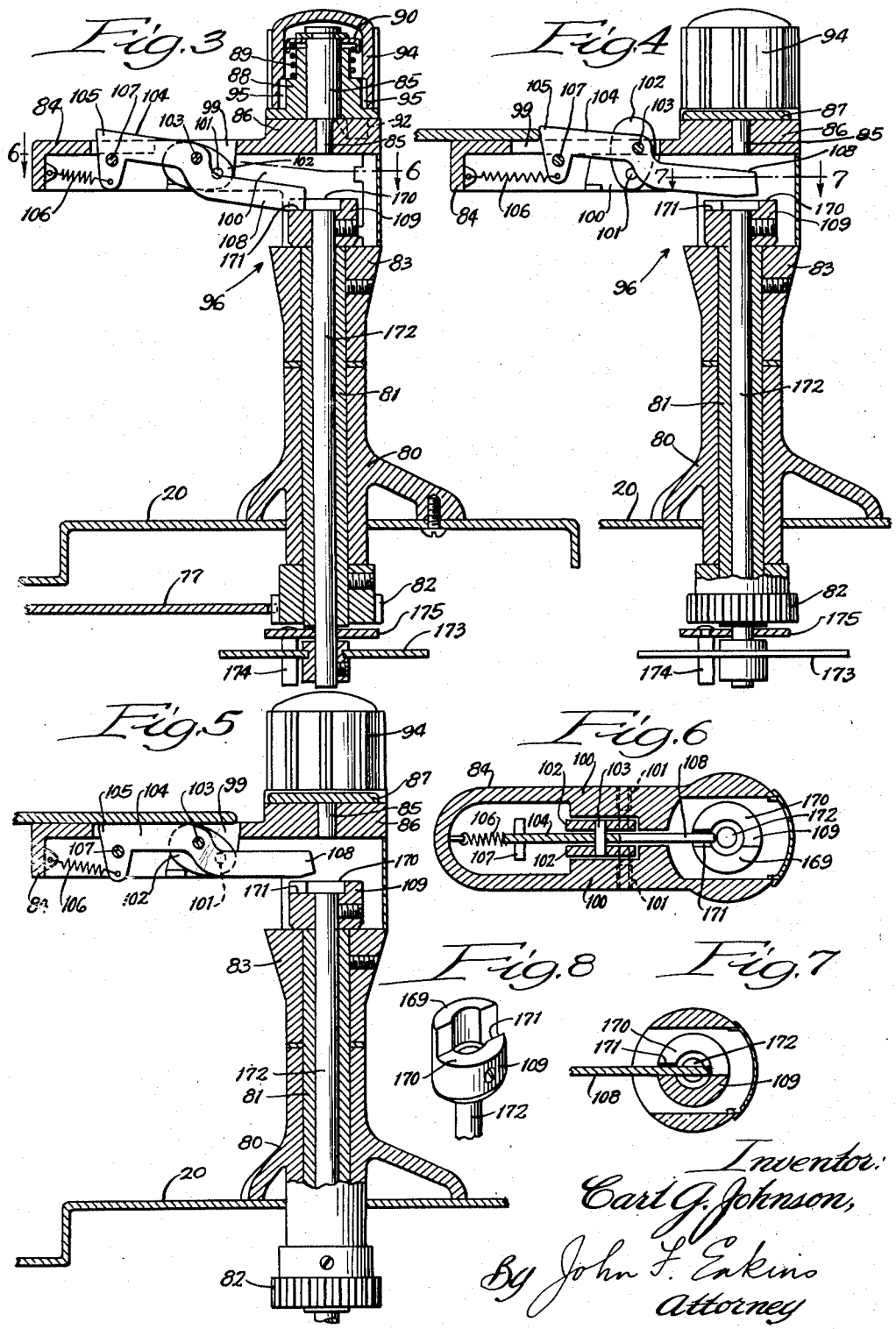
Inventor:
Carl G. Johnson,
By John F. Eakins
Attorney

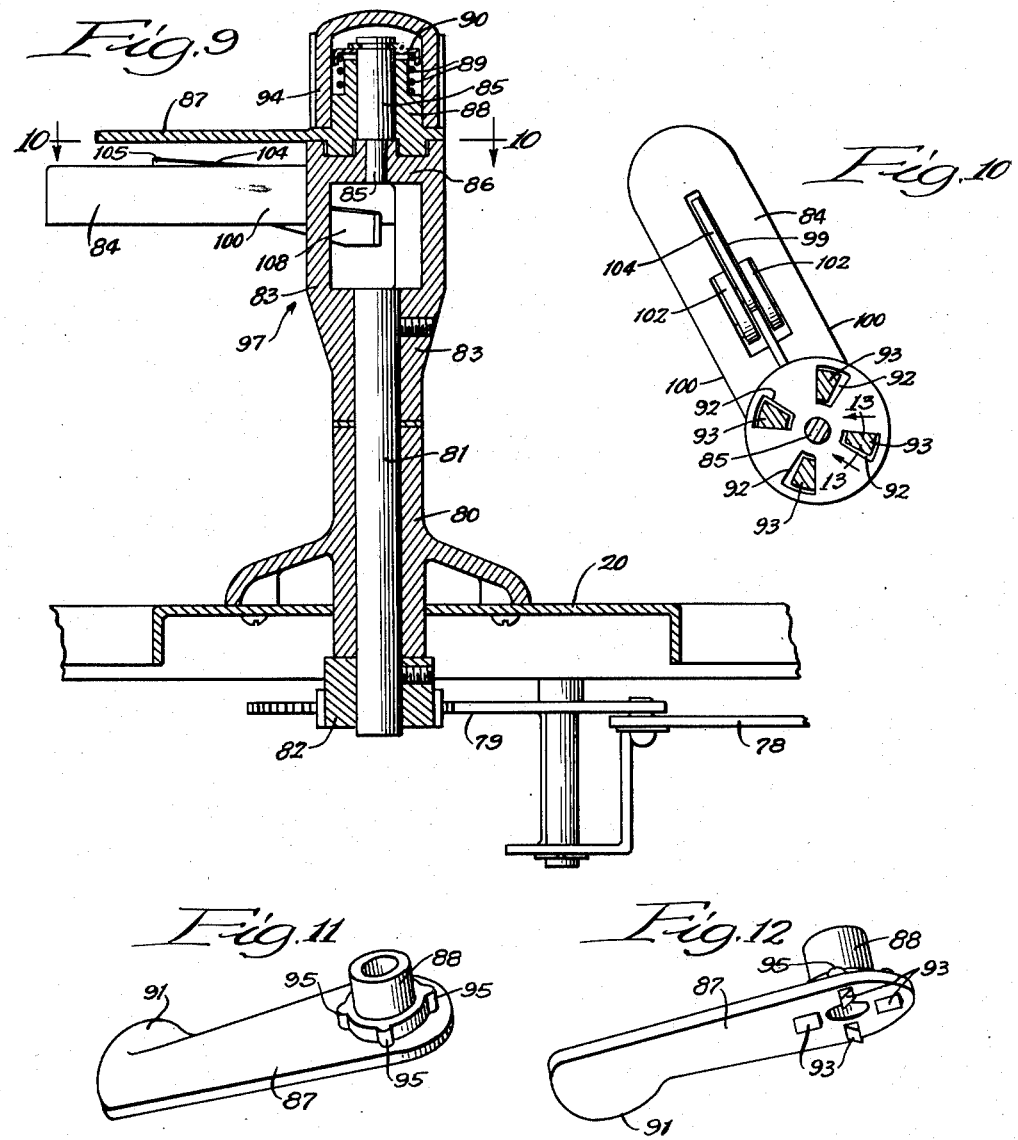

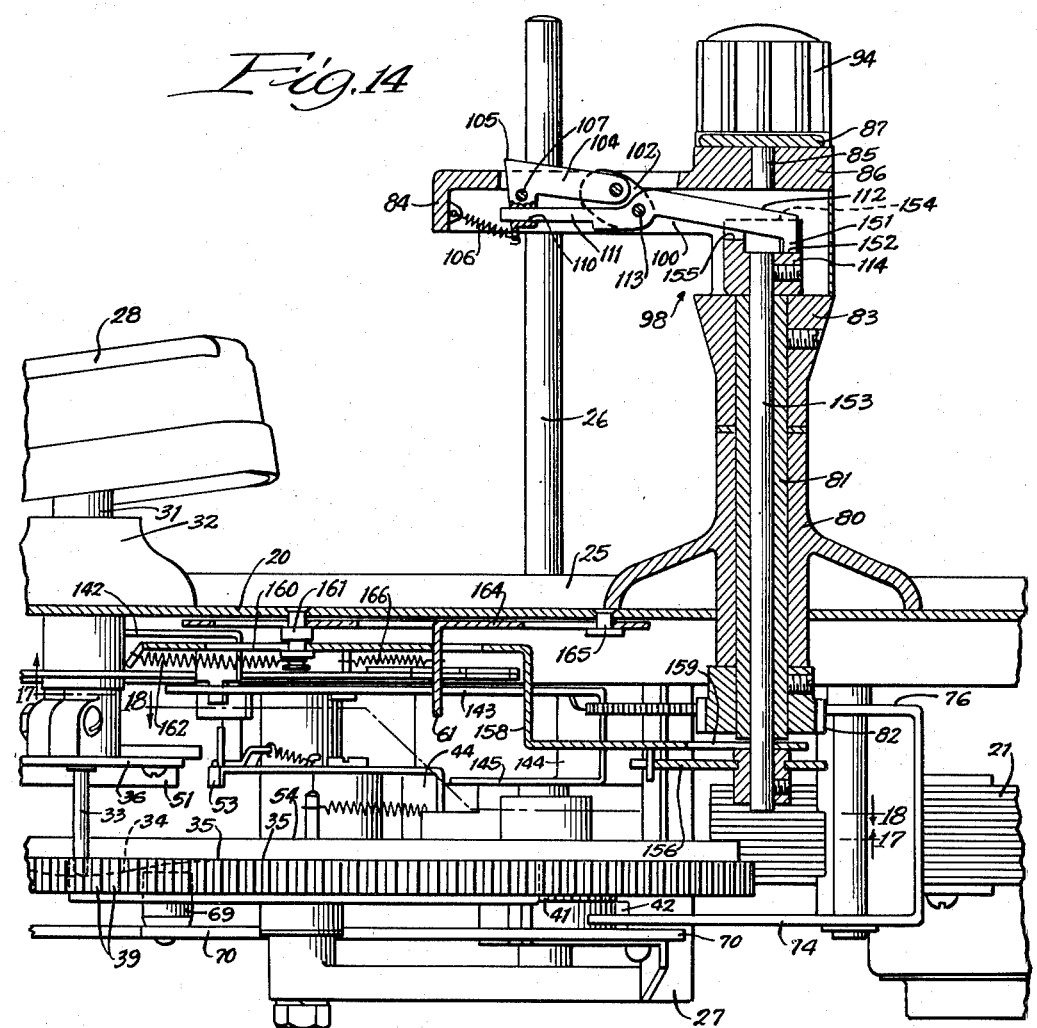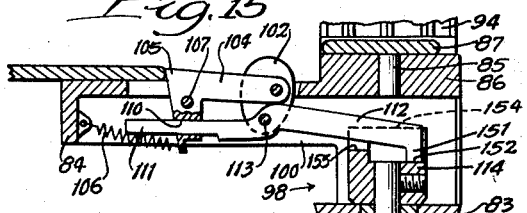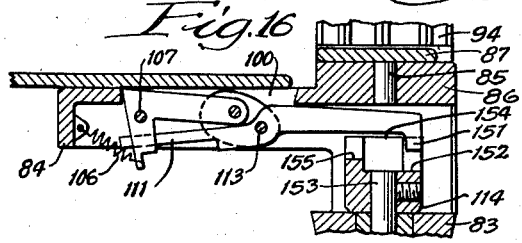

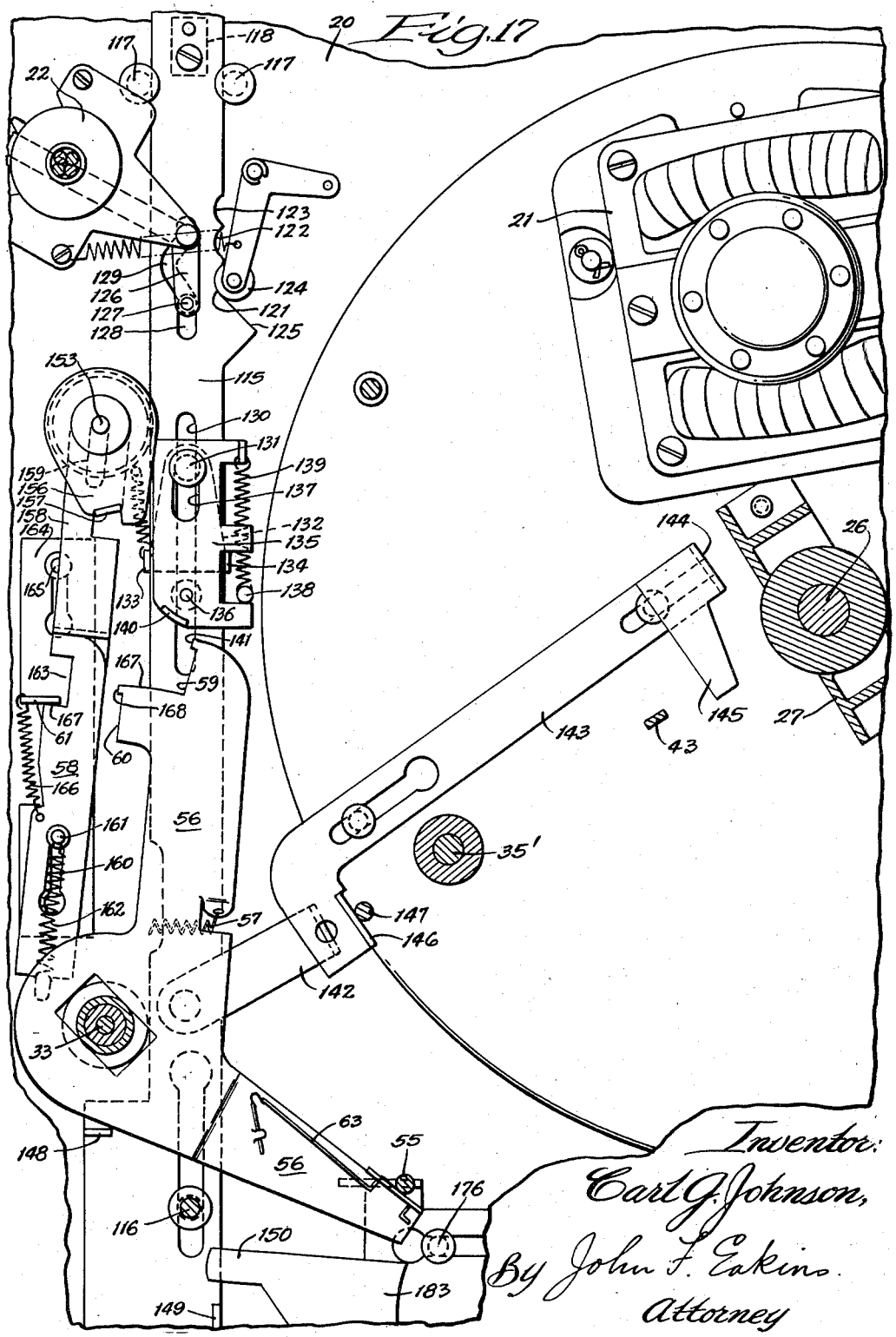

Oct. 21, 1952 C. G. JOHNSON 2,614,847
AUTOMATIC PHONOGRAPH
Filed Feb. 9, 1945 8 Sheets-Sheet 7
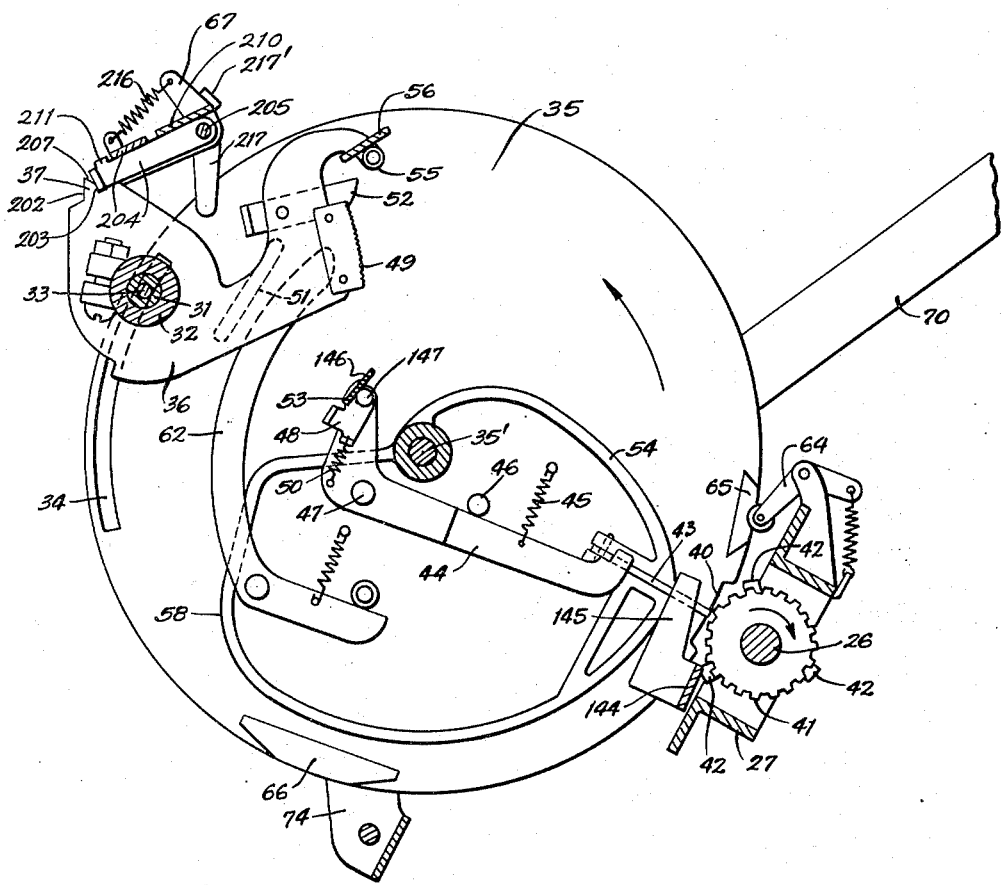
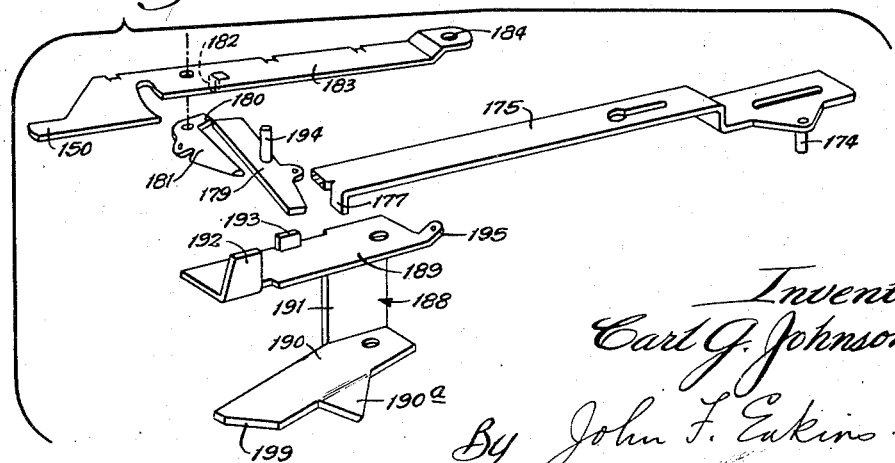
Inventor:
Carl G. Johnson,
By John F. Eakins
Attorney Oct. 21, 1952  C. G. JOHNSON  2,614,847
AUTOMATIC PHONOGRAPH
Filed Feb. 9, 1945  8 Sheets-Sheet 8
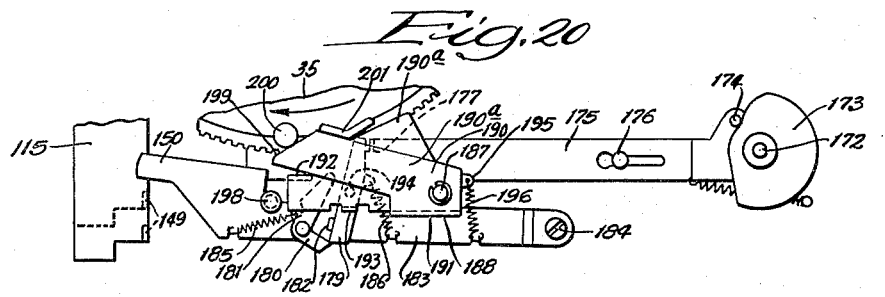
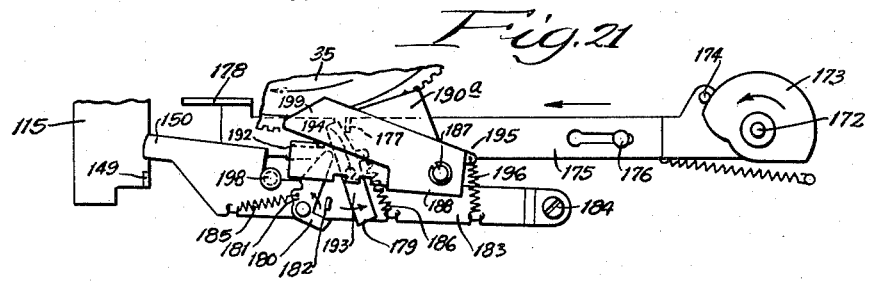
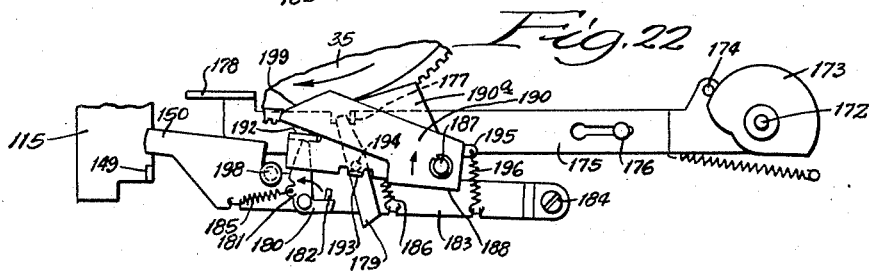
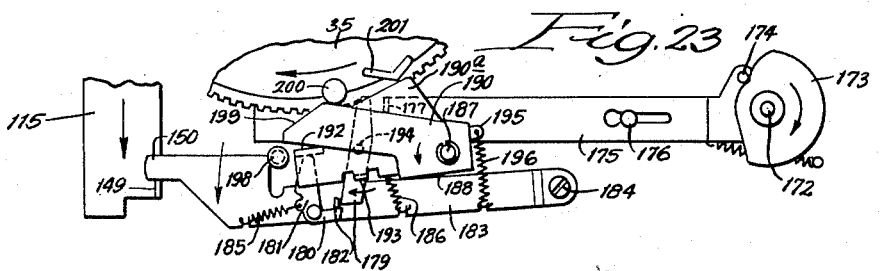
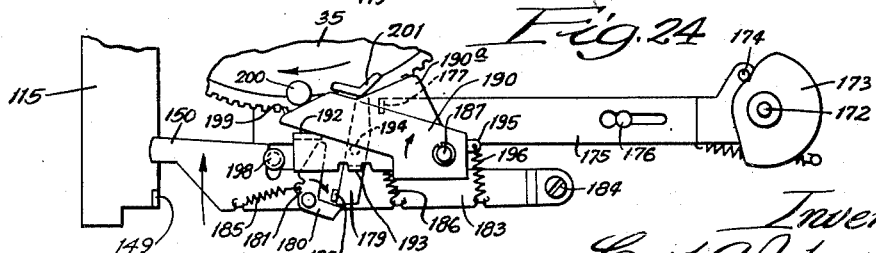
Inventor.
Carl G. Johnson,
By John F. Eakins
Attorney Patented Oct. 21, 1952

2,614,847

UNITED STATES PATENT OFFICE 2,614,847

AUTOMATIC PHONOGRAPH

Carl G. Johnson, Chicago, Ill., assignor to J. P. Seeburg Corporation, Chicago, Ill., a corporation of Illinois Application February 9, 1945, Serial No. 576,931

3 Claims. (Cl. 274—10)

This invention relates to automatic phonographs of the general type in which one record after another is supplied to a turntable for reproduction.

This invention relates more particularly to phonographs of the type in which a plurality or stack of records is supported upon arms above the turntable. The supporting arms constitute, with superior blades, escapements, the superior blades being arranged to enter the stack above the lowermost record after which the supporting arms are withdrawn from below the lowermost record whereby the lowermost record drops onto the turntable. However, the escapements may be in other forms and my invention is not intended to be limited to the particular form shown.

One of the objects of the invention is to provide an improved escapement assembly which is free for manual actuation at any time when it is not being driven by the machine, so that the escapements can very readily be completely thrown out of the path of the records, for removal of records from the turntable or for manual operation of the phonograph. When a plurality of escapements are employed, they are operatively connected together so that manual actuation of one escapement actuates all the others.

A further object of the invention is to provide a phonograph which automatically returns the escapements to normal positions irrespective of the positions in which they may be elevated.

Another object of the invention is to provide an improved means associated with the escapement member for stopping the phonograph after the last record has been played.

A further object of the invention is to provide an improved phonograph in which improved means on one of the escapements is provided for the purpose of automatically setting the phonograph for playing records of different sizes.

A further object of the invention is to provide an improved phonograph having escapements, means on the escapements for elevating a large record which may be located above a smaller lowermost record and in which such elevating means is associated with mechanism for stopping the phonograph when the last record has been played.

A further object of the invention is to provide an improved phonograph having escapements, means on the escapements for elevating a large record which may be located above a smaller lowermost record and in which such elevating means is associated with mechanism for setting the phonograph for playing the lowermost record.

Other objects, advantages and capabilities of the invention will appear from the following description of a preferred embodiment thereof taken in conjunction with the accompanying drawings in which:

Fig. 3 is a sectional detail through one of the record escapements, the section being taken on the broken line 3—3 of Fig. 1;

Fig. 4 is a similar view showing the manner in which this escapement cooperates with a ten-inch record;

Fig. 5 is a similar view showing the manner in which this escapement cooperates with a twelve-inch record;

Fig. 6 is a sectional plan view taken on the line 6—6 of Fig. 3;

Fig. 7 is a sectional plan view taken on the line 7—7 of Fig. 4;

Fig. 8 is a perspective view of a clutch element shown in Figs. 3 to 7 inclusive;

Fig. 9 is a sectional elevation through another escapement, the section being taken on the line 9—9 of Fig. 1;

Fig. 10 is a sectional detail view taken on the line 10—10 of Fig. 9;

Fig. 11 is a perspective view of the blade of the escapement;

Fig. 12 is a similar view, showing lifting cam elements on the blade;

Fig. 13 is a sectional detail view taken on the line 13—13 of Fig. 10;

Fig. 14 is a sectional view through another escapement and the adjacent parts of the phonograph, the section being taken on the line 14—14 of Fig. 1;

Fig. 15 is a fragmentary view showing escapement elements of Fig. 14 in the position determined by a ten-inch record;

Fig. 16 is a similar view showing the same escapement elements in a positioned determined by a twelve-inch record;

Fig. 16A is a plan view of a clutch member shown in Figs. 14 to 16;

Fig. 17 is a sectional inverted plan view, the section being taken on the line 17—17 of Fig. 14;

Fig. 18 is a sectional plan view, the section being taken on the line 18 of Fig. 14;

Fig. 19 is an expanded perspective view of parts of the mechanism for automatically stopping the phonograph after the playing of the records;

Fig. 20 is a fragmentary view showing said elements in their positions after the automatic stopping of the phonograph;

Fig. 21 is a similar view showing the manner in which the latch 179 is affected by actuation of the escapements after the playing of all the records;

Fig. 22 is a similar view to Fig. 21 but showing the manner in which the dog 181 responds to its release by the latch 179;

Fig. 23 shows the manner in which these elements move the switch to "off" position;

Fig. 24 shows the elements moving towards their final position shown in Fig. 20, after the switch is moved to its "off" position.

Figure 1:
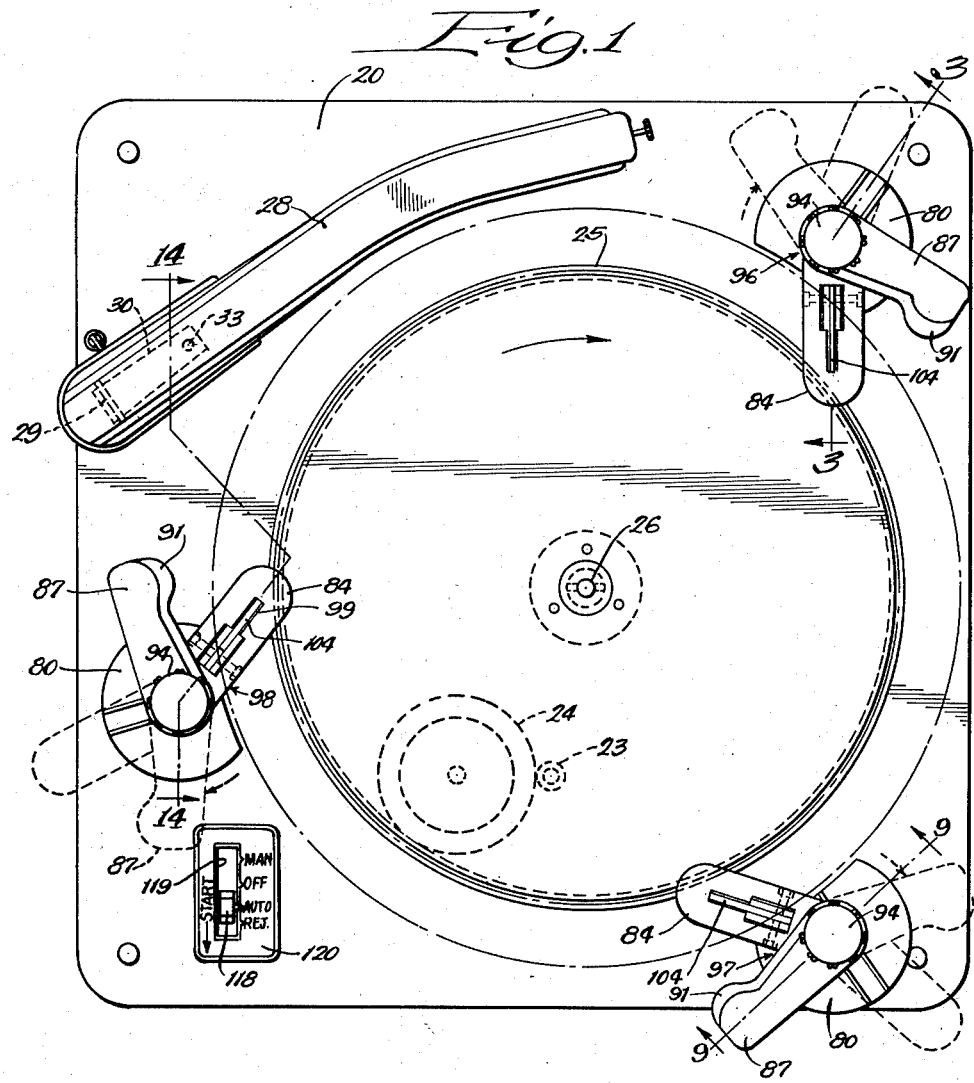
Figure 1 is a plan view of a phonograph embodying my invention.

Referring to the accompanying drawings, the phonograph comprises a motor board or base plate 20 on the under side of which is mounted an electric motor 21 which is controlled by a switch 22 also mounted on the under side of the board 20. The motor 21 carries a wheel 23 which frictionally drives a rubber tired wheel 24, the latter engaging the rim of the turntable 25 to drive the same. The wheel 23 is carried by the shaft of the motor. The turntable 25 is mounted on the turntable spindle 26 which is supported in suitable bearings carried by a bracket 27 mounted on the under side of the motor board 20.

The player arm 28 is pivotally mounted at 29 to a horizontal arm 30 carried by a sleeve 31. The sleeve 31 is mounted for rotation on a vertical axis within a standard 32 mounted on the motor board 20. A pin 33 extends through the sleeve 31 in free sliding relation. The upper end of the pin 33 is arranged to engage the player arm 28 at a point forwardly of the pivot 29 so that when the pin 33 is moved upwardly, the needle and the player arm are elevated upwardly away from the records on the turntable.

During the playing of a record the lower end of the pin 33 rests within a cam recess 34 in the upper surface of a cam gear 35. When the cam gear 35 starts to move, pin 33 moves up the rather steep end of the cam recess 34 and consequently the first thing which happens is the elevation of the player arm out of engagement with the records. As the cam gear 35 approaches the end of a complete revolution, the pin 33 rides into the gently sloping end of the recess 34 so that the player arm is allowed gently to move down to bring the needle into engagement with the uppermost record on the turntable.

The cam gear 35 is mounted for free rotation on a shaft 35' which is supported on the lower side of the motor board 20 and on an extending part of the frame 27. The manner in which the cam gear 35 is given a single revolution for each record-changing cycle will be hereinafter described.

On the lower end of the sleeve 31 is rigidly mounted an arm 36 so that this arm follows all the horizontal movements of the player arm. The arm 36 is provided with a locking-latching detent 37 which cooperates with a detent 38, the function and operation of which will hereinafter be disclosed. The arm 36 is shown on Fig. 18 in the position it has during the playing of a record, the pin 33 being in the lowermost part of the recess 34. The cam gear 35 is at rest.

The cam bear 35 is provided with a peripheral series of teeth 39, there being a gap in the series at the position 40. The teeth 39 are arranged to mesh with a pinion 41 mounted on the spindle 26. Below its teeth the pinion 41 carries a few larger teeth 42 which are arranged to engage the outer end of an L-shaped dog 43 when that dog is allowed to move by gravity to its lowermost position.

The dog 43 is mounted in a radial slot in the cam gear 35 and its outer end is normally held out of engagement with the large teeth 42 by means of a latch 44 which engages the upwardly directed arm of the dog 43. The latch 44 is held by a spring 45 in normal latching position which is defined by a stop 46 on the cam gear 35.

The latch 44 is pivotally mounted at 47 on the upper side of the cam gear 35 and its end remote from the dog 43 carries a spring tensioned pawl 48. The arm 36 has a serrated member 49 adapted to engage and deflect the pawl 48 slightly from its normal position against the action of a positioning spring 50. During the latter part of the playing of a record, the serrated member 49 slips over the pawl 48.

When the needle runs into the eccentric groove on a record after reproduction, the arm 36 is moved outwardly and the latch 44 is thereby swung in clockwise direction as viewed in Fig. 18 so that the dog 43 moves down by gravity until it engages one of the teeth 42 on the pinion 41. This engagement effects the movement of the cam gear 35 sufficiently to engage its teeth 39 with the pinion 41. Consequently, the cam gear 35 is driven one revolution in the counterclockwise direction as viewed in Fig. 18. During this movement the upwardly directed arm of the dog 43 engages a cam member 51 on the lower side of the arm 36 so that the dog 43 is again latched by the latch 44.

Means are provided on the cam gear 35 to limit the downward movement of the dog 43 so that in its lowermost position it is on a level with the large teeth 42. In this lowermost position the end of the latch 44 bears against the upwardly directed arm of the dog 43 so that the dog is again latched merely by moving the upwardly directed arm of the dog 43 inwardly towards the center of the cam gear 35.

The arm 36 carries a rigid contact 52 adapted to engage a cam flange 53 bent down from the latch 44. Consequently if a record is provided, not with an eccentric end groove but with a groove which runs towards the center of the record, the trip will be actuated by the elements 52 and 53.

On the upper side of the cam gear 35 is an external cam 54 which is arranged to control the outward movement of the player arm. The member 36 carries a pin 55 which projects upwardly and downwardly. The downward portion is engaged by the cam 54 during the counterclockwise rotation of the cam gear 35. It will be seen from the shape of this cam and the shape of the cam groove 34 in Fig. 18 that the first few degrees of movement of the cam gear 35 effects the elevation of the player arm by the pin 33 and that during the next 120° or so the player arm is moved outwardly into its extreme position, that is, beyond the path of the largest size record which may fall onto the turntable.

During the outward movement of the player arm, the upper end of the pin 55 engages one end of a lever 56 which is freely mounted on the sleeve 32 above the boss of the arm 36. The outward movement of the pin 55 carries the lever 56 into its position of Fig. 17 against the action of a strong spring 57.

As the pin 55 engages the fall 58 of the cam 54, the spring 57 carries the lever 56 and thereby the pin 55 into close engagement with the cam fall 58 until the edge 59 or 60 engages an abutment 61, depending upon whether or not a ten or twelve-inch record is to be played. After the lever 56 engages the abutment 61, the arm 36 is prevented from floating inwardly at random by engagement of the pin 55 with the spring pressed arm 62 which tends to hold the pin 55 outwardly in engagement with the lever 56.

Before the pin 55 clears the arm 62, the pin 33 rides down the inclined slope of the recess 34 so that the needle comes into engagement with the topmost record. Consequently, when the pin 52 clears the arm 62, the very light spring 63 carried by the lever 56 and engaging the pin 55 gently moves the player arm inwardly so that the needle enters the initial groove of the record.

The cam gear 35 is held in normal position during the playing of a record by means of a spring pressed arm 64 which engages a recessed element 65 rigidly mounted on the cam gear. The cam gear carries a small cam 66 which engages one end 217 of a lever 67 associated with the locking-latching member 38.

Figure 2:
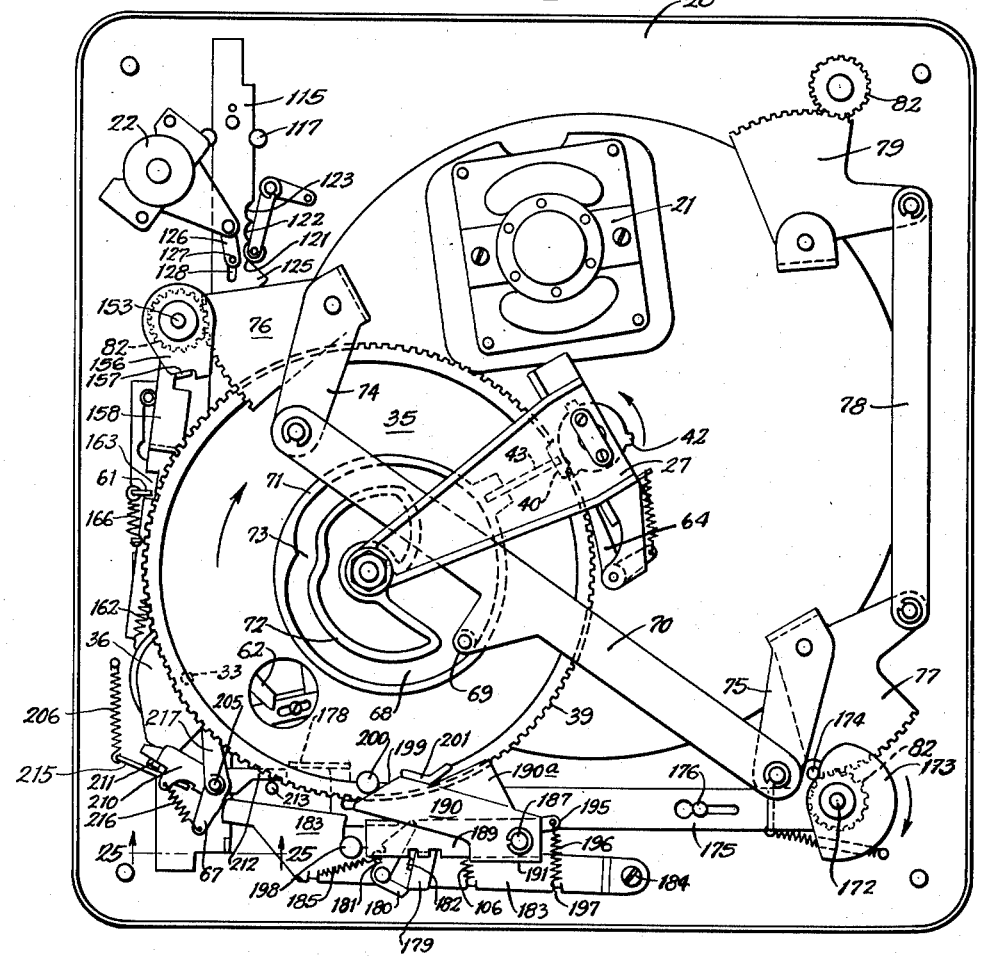
Fig. 2 is an inverted plan view of the phonograph shown in Fig. 1.
Figure 25:
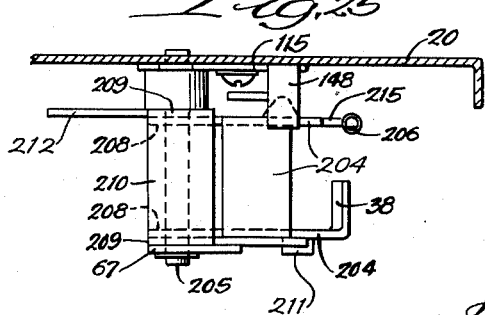
Fig. 25 is a fragmentary elevational view showing the player arm latching-locking mechanism.

On the under side of the cam gear 35 is formed a cam track 68. The cam track 68 cooperates with a roller 69 carried by a bar 70 so that the bar is reciprocated on each revolution of the cam gear 35. Thus, as best seen in Fig. 2, when the cam gear begins to rotate in the clockwise direction, the roller 69 does not move during approximately the first seventy degrees of movement. During the next one hundred and forty degrees or so, the outer wall 71 of the cam track 68 carries the roller 69 into its position nearest the center of the cam gear 35. During the next one hundred fifty degrees rotation the inner wall 72 of the cam track 68 moves the roller 69 outwardly to its initial position, thus completing the reciprocatory movement for the actuation of the record dropping escapements.

The inner wall 72 is formed so that the roller 69 may be moved inwardly to a position quite close to the center of the cam gear 35 and considerably closer than the innermost position 73 defined by the cam track 68. Consequently when the machine is not in a record-changing cycle, the escapement members may be moved bodily from their normal into their record-dropping position (defined by the engagement of the roller 69 and the part 73 of the cam track 68) and still further beyond the record-dropping position and into a position where the escapement members are altogether clear of the path of the largest record being applied to or taken from the turntable.

The bar 70 is connected to arms 74 which are integral with toothed sectors 76 and 77 respectively. The toothed sector 77 is connected by a link 78 to a toothed sector 79. It will readily be understood that when the bar 70 moves to the left as viewed in Fig. 2, all the sectors move in clockwise direction as viewed in that figure, and vice versa.

In the embodiment of the invention illustrated, I provide three escapements which have a common function. Two of these escapements have independent functions. I will therefore describe the common attributes of each escapement.

Each escapement comprises a base or standard 80 which is rigidly mounted on the motor board 20. The standard 80 has a vertical bore which serves as a bearing for a tubular shaft 81. On the lower end of the tubular shaft 81 is rigidly secured a pinion 82 which meshes with one of the sectors 76, 77 or 79.

To the upper end of the tubular shaft 81 is rigidly secured a hollow member 83. From this member extends radially an integral record supporting arm 84 which is preferably provided with a depending flange. From the upper end of the body 83 projects a stud 85 in alignment with the hollow shaft 81, the stud 85 being rigidly mounted in the solid circular wall 86 which constitutes the upper end of the hollow body 83.

A blade 87 is mounted by means of its boss 88 upon the stud 85 and it is pressed downwardly by means of a spring 89 around a reduced portion of the boss 88, which spring bears against the lower portion of the boss 88 and against the underside of a washer 90 mounted on the upper end of the stud 85. Normally the upper end of the boss 88 is in spaced relation to the washer 90 so that a certain limited degree of upward movement against the pressure of the spring 89 is permitted to the blade 87.

At its outer end the blade 87 is provided with a rounded sharpened forward projection 91. As best seen in Fig. 1, the arm 84 projects under a ten or twelve-inch record which is in alignment with the spindle 26 and rests on the arms 84. The arm 87 is approximately sixty degrees behind the arm 84 and is normally clear of both a ten or twelve-inch record.

As best seen in Fig. 14, the turntable spindle 26 projects upwardly beyond the arms 84 and blades 87 so that the records to be played may be set upon the arms 84 as shown in Fig. 1, with the upper end of the spindle 26 extending through their central openings.

When the arms 84 and blades 87 are moved simultaneously in the clockwise direction as viewed in Fig. 1, the arms 84 move in to a radial position and then beyond, in the clockwise direction, and the blade 87 is brought into engagement with the record supported on the arms 84. The blades 87 enter the stack of records above the lowermost record and thereafter the arms 84 clear the lowermost record so that the lowermost record slides down the spindle 26 onto the turntable. Continued rotation of the cam track 68 effects the opposite movement of the arms 84 and blades 87. Before the blades 87 clear the new lowermost record, the arms 84 have moved in below that record. Consequently, when the blades 87 clear the new lowermost record, that record, together with those above it, drop as a stack onto the arms 84 which then continue to move to their normal position shown in Fig. 1.

The wall 86 is provided with a plurality of openings 92 which receive corresponding projections 93 which extend downwardly from the hub 88 of the blade 87. The forward edges of the projections 93 are substantially vertical. The rear faces slope upwardly in the rearward direction, regarding rearward as the opposite of the direction indicated by the arrow in Fig. 13. The arrow indicates the direction in which the hub 88 is moving when the blade 87 is entering the stack.

Consider Fig. 13: The member 86 is moving in clockwise direction as viewed from above, that is, in the direction of the arrow shown in Fig. 13. The sloping side of the openings 92 carries with them the projections 93 so that the blade 87 moves with the body 83 in clockwise direction. If, however, the forward edge 91 of the blade 87 is held by engagement with a record, the projections 93 climb in the openings 92 owing to the arrestment of the boss 88 and the continued movement of the member 86. This upward movement is effected against the pressure of the spring 89. Consequently, the blade 87 is elevated until it reaches the correct position for entry above the lowermost record.

This climbing up feature enables my record-changer to handle records of varying thickness, which is especially important when a record changer is intended to play ten and twelve-inch records. Normally twelve-inch records are substantially thicker than ten-inch records and they normally vary considerably in width among themselves.

The boss 88 carries a plastic cap 94 which is fluted at its lower edge to receive projections 95 on the boss 88. The cap 94 may be secured in position by cement or by friction. The projections 95 and the corresponding fluted formations in the cap prevent relative rotation between the cap and the boss 88. It will readily be understood that if any one of the caps 94 is grasped and rotated, all three pairs of escapement members 84, 87 are actuated in the same direction. Thus, if the cam gear 35 is at rest in the position shown in Fig. 2, the blades can be thus moved from their normal full line position in Fig. 1 to their dotted line position in this figure by merely turning any one of the caps 94.

Likewise the escapements can be turned back to their normal full line position in Fig. 1 by manual actuation of any of the caps 94. However, the machine can effect this return automatically. When the arms and blades of the escapements are in the dotted line position of Fig. 1, the roller 69 is moved in close to the center of the cam gear 35. It will readily be understood that if the cam gear is put into operation, the roller 69 is moved outwardly almost to normal position, then it is moved inwardly to correspond to the actuated position of the escapements, and then it is moved outwardly again into the position of Fig. 2.

Difficulty is experienced with record changers of this type when it is attempted to play intermixed records of different sizes, usually ten- and twelve-inch records. It so happens that some twelve-inch records become "mushroomed" or warped in such a way that when such a record is in the magazine immediately above a smaller ten-inch record, the edge of the twelve-inch record is below the upper surface of the ten-inch record. In such case the blade 87 would engage the twelve-inch record in the second position from the bottom and injury to that record or to the machine would result.

I provide in the arms 84 elevating means whereby a ten-inch record in the lowermost position actuates such means to elevate a twelve-inch record in the second position.

In view of the individual construction of my three escapements, I have indicated them by the reference numerals 96, 97 and 98 on Fig. 1. In Figs. 3 to 7 I have shown views of the escapement member 96. It is to be noted that the arm 84 is provided with a radial slot 99. From the innermost enlarged end of the slot depend two webs 100. These webs carry aligned pins 101 which serve as pivots for two aligned oval shaped members 102. The two oval shaped members are connected by a pin 103 which is spaced from the pins 101, the pin 103 serving as a pivotal support of an elongated generally horizontal lever 104.

The outer end of the lever 104 is in the form of a detent 105 which normally projects from the slot 99 slightly above the level of the upper surface of the arm 84. The lever is maintained in this normal position by means of an outwardly upwardly directed spring 106 connected to the outer end of the lever 104 and to the outer end of the arm 84. The normal position is defined by the engagement of a pin 107 with the under side of the horizontal portion of the arm 84.

A ten-inch record normally lies upon the arm 84 beyond the normal location of the lever 104. When the arm 84 moves from its full line position in Fig. 1 in the clockwise direction, the detent end 105 of the lever 104 engages the edge of the ten-inch record as shown in Fig. 4. The lever 104 is moved bodily rearwardly by the ten-inch record and the members 102 are swung upwardly into the position shown in Fig. 4.

As shown in Fig. 1, the members 102 are located below the twelve-inch record and if a twelve-inch record is located immediately above the lowermost ten-inch record, it will be elevated away from the ten-inch record by the elements 102 in their Figure 4 position. Consequently, the second from the bottom twelve-inch record is elevated to a position where it cannot be engaged by the blades 87 no matter how much it may be warped or "mushroomed." If the lowermost record is a twelve-inch record, then the detent 105 is depressed as shown in Fig. 5.

It may here be remarked that when either a ten- or a twelve-inch record is on the arm 84, then the tail 108 of the lever 104 is clear of the member 109 as shown in Figs. 4 and 5. When no record is on the arm 84, the tail 108 is in the position shown in Fig. 3. The function of the member 109 will hereinafter be described.

The escapement member 97 is shown in Fig. 9. This escapement member is identical with the escapement member 96, just described, with the exception that the tail 108 of the lever 104 does not engage any member corresponding with the element 109. Indeed, the tail 108 might be omitted in the case of this escapement. The only reason why it is employed is because it avoids carrying an extra part.

The escapement 98 is shown in Figs. 14, 15 and 16. The structure with respect to the elements 99 to 107 inclusive is precisely similar to that of the escapement 96 shown in Fig. 3, with the exception that the lever 104 is not provided with the tail 108 and the two pins 101 are replaced by a pin 113 which extends through the two webs 100. The lever has a radially directed opening 110 in which slides the tail 111 of a lever 112 which is mounted on the center part of the pin 113.

It is to be noted that when the lowermost record is a ten-inch record, the oval members 102 are moved upwardly as shown in Fig. 15 so that a twelve-inch record above the lowermost ten-inch record would be elevated in the manner previously described. It may here be remarked that a ten-inch record in the lowermost position leaves the lever 112 in cooperative engagement with a member 114 as shown in Fig. 15 whereas a twelve-inch record in the lowermost position raises the lever 112 out of operative engagement with the member 114 as shown in Fig. 16. The function of the member 114 will hereinafter be described.

On the under side of the motor board 20 I mount a control bar 115 for longitudinal slidable movement. One end of the bar may be supported by a slot and pin connection 116. The other end of the bar may be supported by means of headed studs 117. A small handle 118 rigidly carried by the bar 115 extends through an opening 119 in the motor board. This opening is suitably surrounded by an escutcheon plate 120 which bears indicia as shown in Fig. 1. This indicia comprises an arrow and a direction "Start." This instructs the user to move the handle 118 down all the way to start the phonograph for automatic operation. This brings the handle 118 temporarily to "reject" position which actuates the trip and starts a record changing single rotation of the cam gear 35. The handle 118 moves to automatic position immediately it is manually released. To stop the phonograph the handle 118 is moved to the "Off" position.

For manual operation, the handle 118 is moved past the "Off" position to "Manual" position which is on the other side of the "Off" position from the "Automatic" position.

The bar 115 is provided with notches 121, 122 and 123 which are arranged to receive a spring pressed roller 124 to maintain the bar in desired position. When the roller 124 is in the notch 123 the machine is set for manual operation. In the "Off" position the roller 124 is received in the notch 122. In the automatic position, the roller 124 is received in the notch 121. When the bar 115 is moved temporarily to "reject" position, the roller 124 rides up the cam 125 on the edge of the bar 115 so that the bar 115 is cammed back to automatic position immediately it is manually released.

The switch 22 comprises a switch arm 126 which carries a pin 127. The pin 127 is located within a slot 128 in the bar 115. When the bar is in all its positions except the "Off" position, the pin 127 is substantially on the center line of the bar 115. When the bar is moved to the "Off" position, the pin 127 is located in a portion 129 of the slot 128 which is displaced to the left of the main parts of the slot as shown in Fig. 17. The movement of the switch arm to the left cuts the switch off when the pin 127 is at the portion 129.

The bar 115 is provided with relatively long slot 130 which receives the stud 131 rigidly mounted on an upper slider 132. The slider 132 is provided with downwardly turned lugs 133 and 134 which straddle the bar 115 and cooperate with the stud 131 to guide the slider 132 on the bar 115. One of the lugs 133 serves for the connection of a spring which tends to move the slider 132 away from the lever 56.

A lower slider 135, shown in full lines on Fig. 17, is mounted for sliding movement on the bar 115 by means of a stud 136 which extends through the slot 130 and by a slot 137 through which extends the stud 131.

A stop 138 carried by the motor board 20 engages a projection on the slider 135 so as to limit its movement away from the lever 56. A spring 139 connected to the slider 135 and to the stop 138 tends to move the slider 135 relative to the slider 132 so that the stud 131 normally engages the end of the slot 137 remote from the lever 56.

The spring connected to the lug 133 is much stronger than the spring 139 so that in normal position the two sliders 132 and 133 have the position shown in Fig. 17 when the machine is set for automatic operation. If the control arm 115 is moved to the manual position, the downturned lug 140 on the slider 135 is brought into alignment with the surface 59 of the lever 56. If the bar 115 is moved when the player arm is locked out, as it is when the machine stops automatically, then the lever 56 is in the position shown in Fig. 17 and the lug 140 is free to move into alignment with the surface 59.

As will hereinafter be explained, the movement of the bar 115 unlocks the player arm so that it can be moved manually. The lever 56, being engaged by the lug 140, is unable to follow the pin 55 which moves with the player arm and consequently the player arm is quite free for manual manipulation. If the player arm is in an inner position when the bar 115 is moved downwardly, as viewed in Fig. 17, that is to manual position, the portion of the lever 56 which carries the surfaces 59 and 60 is completely to the left of the slider 135 as viewed in Fig. 17. In these circumstances if the bar 115 is moved to manual position, the upper end of the slot 130 engages the stud 131 and carries it downwardly, as viewed in Fig. 17. The spring 139 causes the slider to follow the stud 131, thus bringing the lug 140 into alignment with the surface 59.

At the end of the playing of the record, the player arm is moved outwardly manually and the curved end of the lever 56 adjacent the surface 59 cams the lug 140 upwardly as viewed in Fig. 17 and immediately the end of the lever 56 clears the lug 140, the spring 139 moves the slider 135 downwardly as viewed in Fig. 17 so that it can engage the surface 59 when the player arm is moved in slightly.

A projection 141 at the outer end of the surface 59 is arranged to lock the lever 56 and the slider 135 together. If it were not for the projection 141, movement of the bar 115 in the upward direction, as viewed in Fig. 17, would result in the withdrawal of the lug 140 from the surface 59. The lever 56 would then snap in the counterclockwise direction under the influence of the spring 57 with possible injury to the needle or record.

In the present structure, if the bar 115 is moved upwardly, as viewed in Fig. 17, from "Manual" position, the projection 141 locks the lug 140 from upward movement and only when the player arm is moved outwardly so as to bring the pin 55 into operative engagement with the lever 56, is the projection 141 removed from the lug 140. Upon such removal the spring 139 snaps the slider 135 back to the position shown in Fig. 17.

A link 142 is pivotally connected to the bar 115 and to a bar 143 slidably mounted on the under side of the motor board 20. The innermost end of the bar 143 is turned downwardly as shown at 144 and this downwardly directed end carries an abutment member 145 which is directed outwardly towards the upwardly extending arm of the dog 43.

When the bar 115 is moved to manual position, the bar 143 is moved outwardly in generally radial direction (with respect to the turntable spindle) and the member 145 engages the upwardly directed end of the dog 43 so that this dog cannot be unlatched and cannot engage the teeth 42 under any circumstances until the bar 115 is moved out of manual position. This means that the record-changing elements, including the record-dropping escapements, are put out of commission temporarily and the means for automatically manipulating the player arm are likewise put out of commission temporarily.

Under these circumstances the phonograph can be operated as a non-automatic phonograph. As has been indicated above, all the arms 84 and blades 87 may be freely rotated into their dotted line positions in Fig. 1 and records may be manually applied to and taken from the turntable, the player arm being free for manual manipulation to engage the initial groove of the record and to be removed manually from the record after the reproduction. When the handle 118 (and the bar 115) is moved to the "Off" position, the switch 22 is opened and the motor ceases to operate. In all other positions of the bar 115 the motor is "On."

Movement of the bar 115 from manual to "Off" position and movement of the bar from "Off" to automatic position, moves the bar 143 radially inwardly towards the center of the turntable. At its outer end the bar 143 carries a depending lug 146 which is arranged to engage the upwardly directed pin 147 carried by the latch 44 only when the bar 115 is moved to its extreme "reject" position. This engagement causes the latch 44 to swing in the clockwise direction as viewed in Fig. 18, thus unlatching the dog 43 and putting the cam 35 into operation for a record-changing cycle.

The bar 115 carries a projection 148 which cooperates with the locking-latching means for the player arm. In short, as will hereinafter be fully described, the projection 148, when the bar 115 is moved to manual position, engages the locking means for the player arm and converts it into a mere latching means to permit manual operation thereof. The bar 115 also carries a projection 149 arranged to be engaged by a member 150 to effect movement of the bar 115 from automatic position to "Off" position when all the records have been played.

During automatic operation the escapement 98 controls the setting of the player arm to correspond with the size of the record which has been dropped from the escapements. As has been pointed out, the detent 105 (Figs. 14, 15 and 16) is normally in its upward position as shown in Fig. 14.

When a ten-inch record is resting on the arms 84, the detent 105 is in its upward position as shown in Fig. 14, and the detent 151 at the extreme end of the lever 112 is located in the recess or notch 152 on the member 114. When the arm 84 of the escapement 98 moves in during the first part of its movement, the detent 105 engages the edge of the ten-inch record as shown in Fig. 15. As seen in Fig. 15 the detent 151 remains in the recess or notch 152. The member 114 is in the form of a collar secured to the shaft 153 which extends through the hollow shaft 81 of the escapement 98. The upper end of the member 114 is stepped to provide a high portion 154 which extends around almost half of its circumference, a lower portion 155 which extends around almost half of the circumference, and the switch or notch 152 which extends below the surface 155.

When a ten-inch record is being dropped, as shown in Fig. 15, the detent 151 is located in the recess 152 and consequently the member 114 is rotated with the arm 84 in the clockwise direction as viewed from above and in the counterclockwise direction as viewed in Figs. 2 and 17 from below.

At its lower end the shaft 153 rigidly carries a cam 156 which engages a lug 157 on a bar 158. The bar 158 is mounted for slidable axial movement by means of a slot 159 through which extends the shaft 153, and a slot 160 through which extends the stud 161.

A spring 162 connected to the bar 158 and to the stud 161 maintains the projection 157 in contact with the cam 156. When the cam 156 moves in the counterclockwise direction, as viewed in Fig. 17, the bar 158 moves upwardly, as viewed in that figure, carrying with it the abutment 61, which abutment is located within a notch 163 located in one side of the bar 158. The abutment 61 projects downwardly from a bar 164 which is mounted for slidable movement on the under side of the motor board 20 by means of the stud 161 and a stud 165, which studs extend through suitable slots in the bar 164.

The bar 164 is connected to the bar 158 by means of a spring 166 which causes the projection 61 normally to engage the lower side of the notch 163. If the cam 156 is not actuated, then the surface 60 of the lever 56 will engage the abutment 61, locating the player arm in initial playing position for a twelve-inch record. If, however, the cam 156 is moved in counterclockwise direction, as viewed in Fig. 17, then the bar 158 carries the abutment 61 into position to be engaged by the surface 59 of the lever 56, thus causing the automatic location of the player arm at the initial playing position for a ten-inch record.

The cams are arranged so that the lever 56 rotates in the counter-clockwise direction, as viewed in Fig. 17, about the time that the escapements have completed the first movement of their reciprocation. Consequently, the lever 56 engages the abutment 61 before the return movement of the escapements.

During the initial part of the return movement of the escapements, the records in the magazine are supported by the blades 87. Consequently, during the return movement, the detent 105 is in the position shown in Fig. 14 and the engagement of the detent 151 with the high portion 154 of the member 114 effects return of the cam 156 towards the position shown in Fig. 17. When the blades 87 clear the stack of records, these records fall down on the supports 84. If the next record is a twelve-inch record, the detent 105 is depressed in the manner shown in Fig. 16. The member 114 is still actuated by the returning arm 84 because the detent 151 is still in engagement with the high portion 154 of the member 114.

When a twelve-inch record is resting on the arm 84 of the escapement 98, the lever 112 is in the position shown in Fig. 16; that is, the main part of the lever 112 is above the high portion 154 and only the detent 151 is below this high portion. The detent is, however, above the lower portion 155 and is fully out of the slot 152. Consequently, when the arm 84 starts moving in clockwise direction as viewed from above, the member 114 is not driven by the lever 112 and the cam 156 is not actuated so that the abutment 61 is in its normal position for setting the player arm to an initial position for a twelve-inch record.

When the cam 156 is actuated by a ten-inch record about to be dropped and the lever 56 moves its surface 59 into engagement with the abutment 61, this abutment is retained in engagement with this surface by the edge 167 between the two surfaces 59 and 60. The bar 158 is returned during the same record changing cycle. The bar 164 does not return to its normal position until after the playing of the record and until the player arm is moved out towards its extreme position in the next record-changing cycle. The notch 163 is sufficiently large to permit the return of the bar 158 by the cam 156 while the abutment 61 is bearing against the surface 167.

At the outer end of the surface 60 is a detent 168 which prevents the abutment 61 from being slid off the surface 60 unless the lever 56 is first moved by the player arm away from the abutment 61. In the absence of the detent 168, it would be possible to slide the abutment 61 along and clear of the surface 60 whereupon the spring 57 would forcibly throw the player arm inwardly with possible damage to the needle, pickup or record.

When the machine is set for automatic operation, it is automatically stopped when the last record has been played. This is effected by means which will now be described.

Referring to Figs. 3 to 7, it is to be noted that the tail 108 of the lever 104 is arranged to cooperate with the member 109 which is generally similar to the member 114. The member 109 comprises a high portion 169, a low portion 170, and a slot 171 below the low portion 170 adapted to receive the tail 108 of the lever 104. When no record is on the arms 84, the tail 108 is in the normal position of the arm 84 in the slot 171 as shown in Fig. 3. Consequently, movement of the arm 84 in the clockwise direction as viewed from above, will impart a similar movement to the shaft 172 which extends down through the hollow spindle 81. The return movement of the arm 84 brings the member 109 back to normal position.

When a ten-inch record is engaged by the detent 105 the tail 108 is lifted out of the slot 171 to a position above the lower portion 170. Consequently, during the first half of the reciprocation of the arm 84, the tail 108 rides around above the low portion 170 and does not actuate the member 109.

On the return movement of the arm 84, the tail 108 cannot actuate the member 109 because it is not in the slot 171 and it does not contact the higher portion 169. The same is true when a twelve-inch record rests on the arm 84 as will appear from Fig. 5.

It is to be noted that no matter what manipulation may be applied to the detent 105, the member 109 always returns to normal position. Thus, if one turns the handle 94 part way in the clockwise direction as viewed from above, and then depresses the detent 105, the member 109 may be displaced only part way from its normal position. But on the return movement of the arm 84 to its normal position, the tail 108 engages the high portion 169 of the member 109 and returns this member to normal position, even if the detent 105 is manipulated to prevent the tail from entering the slot 171.

On the lower end of the shaft 172 is rigidly mounted a cam 173 best shown in Figs. 2 and 20 to 24 inclusive. This cam cooperates with a pin 174 on a bar 175 which is mounted for slidable movement with the aid of studs 176 and the shaft 172 which extend through suitable slots in the bar 175.

The bar 175 is provided with a down-turned lug 177 and with an offset end 178 as shown in Fig. 21. The lug 177 is arranged to engage one end of a latch 179 which is pivotally mounted on the motor board 20. The other end of the latch 179 is arranged to engage the tail 180 of a dog 181 and also an abutment 182.

The abutment 182 is struck down from an arm 183 which is pivotally mounted at 184 on the under side of the motor board, the major portion of the arm 183 being above the latch 179.

The dog 181 is pivotally mounted on the arm 183 in the same plane as the latch 179.

A spring 185 connected to the arm 183 and to the dog 181 tends to move the dog so as to bring its tail 180 into engagement with the stop 182. A spring 186 connected to the latch 179 and to the arm 183 tends to move the latch into engagement with the stop 182.

Also mounted on the under side of the motor board is a pin 187 which serves for the pivotal mounting of the double armed member 188 shown in perspective in Fig. 19. The double armed member comprises an upper plate 189 and a lower plate 190 together with a vertical web 191 connecting them.

The lower plate 190 comprises a cam portion 190a which is arranged to engage the outer end of the dog 43 and to raise the same while it is passing the plate 190. It is preferred that the temporary elevation of the dog 43 is not sufficient to latch the same by the latch 44 although this may be done if desired, in which case the cam member 51 may be omitted.

The upper plate 189 has an upturned lug 192 which is adapted to cooperate with the dog 181 in the manner hereinafter to be described. The upper plate 189 also carries an upturned lug 193 which is arranged to engage the projecting pivot pin 194 of the latch 179.

The upper plate 189 also carries a lug 195 which is connected by a spring 196 to a lug 197 on the arm 183. The arm 183 is arranged to engage a stop 198 which limits its inward movement.

The lower plate 190 comprises a projecting angular portion 199 which is arranged to cooperate with a pin 200 and a V-shaped member 201 which project downwardly from the cam gear 35 near the periphery thereof. When the cam gear 35 is in its normal position of rest as shown in Fig. 20, that is, with the gap 40 opposite the gear 41 and with the arms 64 in engagement with the recessed element 65, the angular portion 199 bears against both the pin 200 and the adjacent part of the V-shaped member 201.

When the phonograph is set for automatic operation and has thereafter played all the records placed upon the arms 84, the machine is brought to rest with its elements in the position shown in Fig. 20, with the bar 115 in the full line "Off" position. The latch 179 bears against the abutment 182 and its outer end engages the tail 180 of the dog 181, holding this dog clear of the lug 192. Several records may be placed upon the arms 84 and the motor may be started by moving the bar 115 through the automatic position to the reject position momentarily, whereupon the bar 115 returns to the automatic position, locating the projection 149 in its dotted line position in Fig. 20. The lug 146 actuates the latch 44 so that the cam gear 35 is moved through a complete revolution in the direction indicated by the arrow on Fig. 20.

At the beginning of the rotation of the cam gear 35, the V-shaped member 201 pushes the double armed member 188 outwardly and the lug 192 merely moves the dog 181 in the clockwise direction as viewed in Fig. 20. After the V-shaped member 201 passes the angular portion 199, the double armed member 188 is free to move from its position of Fig. 20 into the more inward position shown in Fig. 20, the lug 193 abutting against the pin 194. The dog 181 returns to its position of Fig. 20, that is, its tail 180 abuts against the outer end of the latch 179.

Towards the end of the complete revolution of the cam gear 35, the pin 200 engages the angular portion 199 and again moves the double armed member 188 outwardly, with the same result, as far as the dog 181 is concerned. When the cam gear 35 is arrested, the elements of Fig. 20 are in the position shown in that figure, the projection 149 being in its dotted line position. This cycle continues as long as there are records on the arms 84 since the cam 173 is not actuated.

After the playing of the last record, the cam gear 35 again goes into operation and after the V-shaped member 201 has cleared the angular portion 199, the cam 173 is moved with the escapement 96 so that the bar 175 is moved to the left as viewed in Fig. 20, into the position shown in Fig. 21. In this movement the lug 177 engages the latch 179 and swings it into the position shown in Fig. 21, releasing the dog 181 so that it may swing in counterclockwise direction as viewed in this figure, until its tail 180 engages the abutment 182 as shown in Fig. 22. This brings the end of the dog 180 into alignment with the lug 192. Continued rotation of the cam gear 35 effects return of the cam 173 so that the lug 177 is removed from the latch 179 so that this latch engages the end of the tail 180 of the dog 181 which is now resting against the stop 182.

Towards the end of the rotation of the cam gear 35, the pin 200 engages the angular portion 199 and pushes the double armed member 188 outwardly, as shown in Fig. 23. During this outward movement, the lug 192 forces the dog 181 and the arm 183 outwardly. The end of the arm 183 engaging the projection 149, carries the bar 115 to its "Off" position, thus stopping the motor. This outward movement is sufficient to carry the extremity of the tail 180 of the dog 181 beyond the end of the latch 179 shown in Fig. 23.

The momentum of the cam gear 35 carries the pin 200 past the angular member 199 and the double armed member is free to move inwardly as shown in Fig. 24, thus permitting the arm 183 to move inwardly, bringing the tail 180 of the dog 181 into engagement with the end of the latch 179. The inward movement of the arm 183 causes the dog 181 to move in the clockwise direction as viewed in Fig. 24 until it clears the lug 192, the parts attaining their position of Fig. 20 with the bar 115 and its projection 149 in the full line position.

After the machine has stopped, the escapements are manually actuated to bring the blades 87 and the arms 84 into their dotted line positions in Fig. 1 for removal of the played records from the turntable. During this manual movement, since there is no record on the arms 84, the cam 173 is rotated in the counterclockwise direction as viewed in Fig. 20. The latch 179 is consequently swung in the counterclockwise direction by the lug 177 which permits the dog 181 to move into engagement with the end of the lug 192.

On the return movement of the cam 173 by manual actuation of the escapements, the latch 179 is free to return in the clockwise direction into engagement with the end of the tail 180 of the dog 181. When the bar 115 is again moved to reject position and returns to automatic position, the cam gear 35 again starts a complete revolution to drop a record onto the turntable.

At the beginning of this complete revolution, the V-shaped member 201 moves the double armed member 188 downwardly, rotating the dog 181 in the clockwise direction as viewed in Fig. 20. Consequently, the tail 180 is carried clear of the latch 179 which moves into engagement with the abutment 182.

When the V-shaped member 201 clears the angular portion 199, the double armed member 188 moves inwardly, leaving the dog 181 latched by engagement with the end of the latch 179. The dog 181 remains latched out until the cam 173 is again actuated after the last record has been played.

It will thus be seen that automatic actuation of the cam 173, occurring when the double armed member 188 is in an inward position, results in actuation of the arm 183 to stop the motor, whereas manual actuation of the cam 173 when the double armed member is held in its position of Fig. 20, that is, in engagement with the elements 200 and 201, does not result in the actuation of the arm 183.

The detent 37 of the arm 36 is provided with an outer sloping face 202 which enables it to pass freely the detent 38 when the player arm is moved outwardly to its extreme position. The other side of the detent 37 is provided at its base with a rectangular step 203 which causes the detent 38 to hold the player arm in its extreme outward position until the detent 38 is positively moved outwardly or in the clockwise direction as viewed in Fig. 18.

When the detent 38 is moved part way out, it engages the sloping face 207 of the detent 37 beyond the rectangular step 203 and in this case the player arm may be moved inwardly, the outer end of the detent 37 cooperating with the detent 38 to serve as a latching detent rather than as a lock.

The detent 38 is a lug on a frame 204 which is pivotally mounted on a stud 205 depending from the motor board 20. At its upper end the frame 204 carries a projecting arm 215 to which is connected a spring 206 which biases the detent 38 towards player arm locking position.

The projection 148 on the bar 115 is arranged to engage the arm 215 and to swing the frame 204 slightly in the counterclockwise direction as viewed in Fig. 2 when the bar 115 is moved to manual position. This movement of the frame 204 carries the detent 38 outwardly slightly away from the rectangular step 203 so that it engages only the sloping surface 207 in manual operation. Consequently, the player arm can be moved inwardly and outwardly, the detents 37 and 38 serving as only a yielding latch.

The frame 204 is pivotally mounted on the stud 205 by means of lugs 208. On the outer sides of these lugs are located lugs 209 of a second frame 210 which is also pivotally mounted on the stud 205.

The frame 204 comprises a lug 211 which engages the frame 210 so that it is normally positioned as shown in Fig. 2, with its arm 212 bearing against an abutment 213 as shown in that figure. The offset end 178 of the bar 175 is arranged to slide past the outer end of the arm 212 when the bar 175 is moved to the left as viewed in Fig. 2.

Consequently, the frame 210 is held against counterclockwise movement as viewed in Fig. 2, when the cam 173 is actuated either manually for record removal or automatically by the record changing cycle after the playing of all the records.

At its lower end the stud 205 pivotally carries the lever 67 which is connected by a spring 216 to the frame 210. The lever 67 carries an abutment 217 which normally engages frame 210 so that it is normally positioned as shown in Fig. 2. During the rotation of the cam gear 35, and in the latter part of that rotation, the cam 66 engages the end 217 of the lever 67, swinging it in a direction which increases the tension of the spring 216. The spring 216 is stronger than the spring 206 so that the springing of the lever 67 swings the frame 210 in the clockwise direction as viewed in Fig. 18 and its engagement with the lug 211 carries the frame 204 in the same direction moving the detent 38 clear of the detent 37. The cam 66 engages the lever 67 when the pin 55 is about to move down the cam fall 58 of the cam 54 and the cam 66 maintains the lever 67 displaced until the spring 57 moves the lever 56 and consequently the arm 36 inwardly until the detent 37 is past the detent 38.

After the last record has been played, the cam gear 35 makes a complete rotation which effects the opening of the motor switch as has been previously described. During this rotation the player arm remains locked in its outermost position because the offset end 178 of the bar 175 is displaced towards the left as viewed in Fig. 2 by the actuation of the cam 173 during this cycle. This displacement of the bar 175 brings its offset end into locking engagement with the arm 212 before the cam 66 engages the lever 67. Consequently the frame 210 is held against displacement and the normal position with its detent 38 in engagement with the locking surface 203 of the arm 36. Thus the last actuation of the lever 67 merely expands the spring 216.

While the function and operation of the machine is clear from the foregoing detailed description, a short resume of the operation is now given as an aid to the understanding of the machine:

Assuming that the records have been removed from the turn-table and that the escapement arms and blades are left in their dotted line positions of Fig. 1, the bar 115 is in the "Off" position and the elements shown in Fig. 20 are in the relation shown in that figure. The player arm is in its outermost position and it is locked out by engagement of the detent 38 with the rectangular step 203.

The motor may be put in operation by moving the handle 118 in the "Start" direction, bringing it momentarily into the reject position. In the reject position the depending lug 146 actuates the latch 44 so that the dog 43 is allowed to descend into engagement with the large teeth 42 so as to initiate a single rotation of the cam gear 35. During this rotation the cam 54 does not cooperate with the pin 55, that pin being locked out in its outermost position. The pin 33 is moved upwardly and downwardly which merely causes a slight upward and downward movement of the locked-out player arm.

The cam track 68 brings the arms and blades into their full line position of Fig. 1 no matter where they may be located initially. Since the cam 173 is in its actuated position due to the escapements being in their dotted line position of Fig. 1 without a record on the arms 84, the latch 179 is held away from the dog 181 and consequently when the V-shaped member 201 clears the angular portion 199 of the double armed lever 188, the double armed lever 188 is free to move inwardly to its position of Fig. 22 and the dog 181 moves into its position of that figure.

The cam 66 does not unlock the player arm because the bar 175 is displaced from its normal position locking the frame 210, the frame 204 and its detent 38 against displacement until the cam 66 clears the lever 67. Towards the end of the single rotation of the cam gear 35 the lever 183 is actuated in the manner shown in Figs. 23 and 24, displacing the bar 115 to the "Off" position.

A plurality of records which may be intermixed ten- and twelve-inch records, are now applied to the spindle 26 so as to rest upon the arms 84. The handle 118 is then moved in the "Start" direction so that it momentarily occupies the reject position and then returns to the automatic position. The motor is thus turned on. In the reject position the lug 146 actuates the trip so that the cam gear 35 starts a single revolution.

During the first part of the revolution, the escapements are unactuated. Then they are actuated, being swung in the clockwise and counterclockwise direction, as shown in Fig. 1, to effect deposit of the lowermost record upon the turntable. After the record has been dropped, the cam 66 engages the lever 67 and since there is a record on the arms 84 the cam 173 is not actuated the detent 38 is cleared of the detent 37, whereupon the spring 57 acting on the lever 56 moves the arm 36 inwardly as the pin 55 moves down the cam fall 58 of the cam 54.

If the record being dropped is a twelve-inch record (Fig. 16), the member 114 is not actuated and the cam 156 is not actuated. Consequently the surface 60 of the arm 56 engages the abutment 61 and the spring 57 merely moves the player arm inwardly to the initial playing position for a twelve-inch record. When contact between the surface 60 and the abutment 61 has been established, the pin 55 is held against the arm 62. When the arm 62 clears the pin 55, the spring 63 gently moves the player arm inwardly until it engages the first groove of the record. Before that happens, the pin 33 has entered the recess 34 and allowed the player arm to move down gently until its needle engages the outer edge of the record.

During this rotation of the cam gear 35, the bar 175 is not actuated because the record on the arm 84 of the escapement 96 ensures the condition of Fig. 5 or, in the case of a ten-inch record, the condition of Fig. 4, and the non-actuation of the cam 173.

Consequently, the mechanism shown in Figs. 20 to 24 does not become effective to stop the motor.

During the rotation of the cam gear 35, the dog 43 is latched up by the member 51 and the cam gear stops when the gap 40 comes into alignment with the gear 41, the final position of stoppage being controlled by the elements 64 and 65. During the playing of the record, the player arm moves inwardly, carrying the arm 36 with it. At the end of the playing of the record, the latch 44 is actuated, the dog 43 falls to its lower position, and the record-changing cycle begins.

In the case of a ten-inch record, the cam 173 is likewise not actuated, but in this case the member 114 and the cam 156 are actuated, with the result that the abutment 61 is brought into alignment with the surface 59 of the lever 56. Consequently, when the lever 56 is free to move in the counterclockwise direction, as viewed in Fig. 17, when the cam 66 unlocks the arm 36, the player arm is moved inwardly to initial playing position for a ten-inch record.

Also in the case of a ten-inch record, in the lowermost position on the arms 84, the cams 102 are swung into their upward positions of Figs. 4 and 15 so that a twelve-inch record, which may be immediately above the lowermost ten-inch record, is elevated clear of the ten-inch record before the blades 87 move to less than six inches from the center of the spindle 26.

In all cases the edge 91 of blade 87 may engage the periphery of a record. This is particularly true in the case of a twelve-inch record. This engagement retards the movement of the blade 87 with the arm 84 and the projections 93 creep up the sloping sides of the openings 92 until the blade 87 is elevated into alignment with the top of the lowermost record, whereupon it enters between the lowermost and the next record.

The stack of records is thus played one record after the other and, after the last record is played, the cam gear 35 begins a complete revolution. During this complete revolution, the player arm remains locked out in the extreme position. At the time it would normally be unlocked by the cam 66, the frame 210 is locked by the bar 175 which is actuated by the cam 173 when the escapements are actuated without a record thereon. The actuation of the cam 173 results in the opening of the switch in the manner described above in connection with Figs. 20 to 24.

When the machine is thus normally arrested, the escapements are quite free so that they may be manually rotated by actuating any one of them to bring the blades and arms into the dotted line position of Fig. 1.

The blades and arms should normally be moved into the position referred to when it is desired to operate the machine manually. Manual operation is attained by moving the bar 115 to the "Manual" position. This closes the motor switch and the member 145 is brought into engagement with the dog 43 so that the cam gear 35 cannot go into operation. The projection 148 engages the frame 204 and moves the abutment 38 slightly in the clockwise direction as viewed in Fig. 18. Consequently, the detents 37 and 38 constitute yielding latch means which hold the player arm in its outward position in a manner which can readily be overcome by force manually applied to the player arm.

Although I have described the invention in connection with specific details of a preferred embodiment thereof, it must be understood that such details are not intended to be limitative of the invention except in so far as set forth in the accompanying claims.

I claim:

1. In an automatic record changer, in combination, a turntable, a record dropping escapement adapted to support a stack of records above said turntable, cam means for actuating said escapement to release the lowermost of the stack of records, an operator normally connected to said escapement to be actuated thereby, means engaged by a record on said escapement for disconnecting said operator from said escapement, a switch controlling the operation of the phonograph, a switch control member adapted when actuated to open said switch, a second movable member adapted to be actuated by said cam means near the end of its cycle, a third movable member arranged to communicate movement from the second movable member to the switch control member, a latch normally holding the third movable member in inoperative relation to the switch control and second movable members, said operator being arranged, when operated, to move the latch to unlatching position whereby the third movable member is actuated by the second movable member to move the first movable member to switch opening position near the end of a cycle of said cam means when no record is dropped from the escapement.

2. In an automatic record changer, in combination, a turntable, a record dropping escapement adapted to support a stack of records above said turntable, cam means for actuating said escapement to release the lowermost of the stack of records, an operator normally connected to said escapement to be actuated thereby, means engaged by a record on said escapement for disconnecting said operator from said escapement, a switch controlling the operation of the phonograph, a switch control member adapted when actuated to open said switch, a second movable member, a pair of abutments on said cam means adapted to actuate the second movable member near the end and near the beginning of the cycle of the cam means, one of said abutments being arranged in the stationary position of said cam means to hold the second movable member nearer the switch control member than its position when clear of said abutments, a third movable member arranged to communicate movement from the second movable member to the switch control member, a latch normally holding the third movable member in inoperative relation to the switch control and second movable members, said operator being arranged, when operated, to move the latch to unlatching position whereby the third movable member tends to move into cooperative relation between the second movable member and the switch control member, means on the second movable member for preventing the third movable member from moving into said cooperative relation when the second movable member is in its position relatively nearer to the switch control member, the last mentioned means being arranged to move the third movable member into latched position when the second movable member is actuated by the abutment on the cam means effective near the beginning of the cycle of the cam means, whereby the third movable member is promptly latched by the movement of the cam means after it has been unlatched by manual movement of said escapement while the cam means is stationary and whereby the switch control member is actuated near the end of a cycle of the cam means during which the operator unlatches the third movable member as a result of actuation of the escapement without a record supported thereon.

3. In an automatic record changer, in combination, a turntable, a record dropping escapement adapted to support a stack of records above said turntable, cam means for actuating said escapement to release the lowermost of the stack of records, an operator normally connected to said escapement to be actuated thereby, means engaged by a record on said escapement for disconnecting said operator from said escapement, a switch controlling the operation of the phonograph, a switch control member adapted when actuated to open said switch, a second movable member, an abutment on said cam means adapted to actuate second movable member near the end of the cycle of the cam means, said abutment being arranged in the stationary position of said cam means to hold the second movable member nearer the switch control member than its position when clear of said abutment, a third movable member arranged to communicate movement from the second movable member to the switch control member, a latch normally holding the third movable member in inoperative relation to the switch control and second movable members, said operator being arranged, when operated, to move the latch to unlatching position whereby the third movable member moves into cooperative relation between the second movable member and the switch control member, whereby said abutment near the end of the cycle of the cam means actuates the second movable member and by means of the third movable member the switch control member to open said switch at the end of an operation of said cam means without a record on said escapement, said movement of the third movable member carrying it beyond said latch whereby said third movable member is latched out of engagement with the second movable member as the second movable member returns after being actuated by said abutment.

CARL G. JOHNSON.

REFERENCES CITED

The following references are of record in the file of this patent:

UNITED STATES PATENTS

| Number | Name | Date |
|---|---|---|
| 1,798,047 | Ubrich | Mar. 24, 1931 |
| 2,031,449 | Arvidius | Feb. 18, 1936 |
| 2,270,415 | Catucci | Jan. 20, 1942 |
| 2,292,564 | Johnson | Aug. 11, 1942 |
| 2,295,092 | Offen | Sept. 8, 1942 |
| 2,300,668 | Habegger | Nov. 3, 1942 |
| 2,307,030 | Erwood | Jan. 5, 1943 |
| 2,309,197 | Lewis | Jan. 26, 1943 |
| 2,352,560 | Offen | June 27, 1944 |
| 2,412,441 | Carson et al. | Dec. 10, 1946 |
| 2,421,909 | Roe | June 10, 1947 |
| 2,435,264 | Ansar | Feb. 3, 1948 |

FOREIGN PATENTS

| Number | Country | Date |
|---|---|---|
| 419,299 | Great Britain | Nov. 5, 1934 |